United States Patent
Oue et al.

(10) Patent No.: US 11,604,246 B2
(45) Date of Patent: *Mar. 14, 2023

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventors: Suguru Oue, Kanagawa (JP); Seishiro Kato, Kanagawa (JP); Kazuo Hayashi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/146,743

(22) Filed: Jan. 12, 2021

(65) Prior Publication Data

US 2021/0132178 A1    May 6, 2021

Related U.S. Application Data

(63) Continuation of application No. 16/541,316, filed on Aug. 15, 2019, now Pat. No. 10,928,481.

(30) Foreign Application Priority Data

Feb. 19, 2019   (JP) .............................. JP2019-027281

(51) Int. Cl.
    *G01S 5/02*     (2010.01)
    *H04N 1/32*     (2006.01)
    *H04W 24/10*    (2009.01)

(52) U.S. Cl.
    CPC ............ *G01S 5/021* (2013.01); *G01S 5/0226* (2013.01); *G01S 5/0242* (2013.01);
    (Continued)

(58) Field of Classification Search
    CPC ....... H04W 4/80; H04W 4/025; H04W 4/029; H04W 4/027; H04W 4/026; H04W 88/04;
    (Continued)

(56) References Cited

U.S. PATENT DOCUMENTS

6,344,797 B1 * 2/2002 Hosny ..................... G01S 3/42
                                                    340/12.11
9,652,955 B1 * 5/2017 Ray ....................... H04W 4/023
    (Continued)

FOREIGN PATENT DOCUMENTS

CN         104837118 A  *  8/2015
CN         104837118 A     8/2015
    (Continued)

*Primary Examiner* — Matthew C Sams
(74) *Attorney, Agent, or Firm* — Oliff PLC

(57) ABSTRACT

An information processing apparatus includes: a first receiving unit that receives a radio signal through a first wireless communication channel; a second receiving unit that receives a radio signal through a second wireless communication channel in which position measurement accuracy and radio wave reachable range are higher and shorter respectively than those in the first wireless communication channel; a calculation unit that calculates information on position of the information processing apparatus by using field intensity of the radio signal received by the first or second receiving unit; and a control unit that causes the calculation unit to calculate the information based on the radio signal received by the first receiving unit, and, if a preset condition is satisfied, performs switching control to cause the calculation unit to calculate the information based on the radio signal received by the second receiving unit.

10 Claims, 12 Drawing Sheets

(52) U.S. Cl.
CPC ....... *G01S 5/0252* (2013.01); *H04N 1/32512* (2013.01); *H04N 1/32587* (2013.01); *H04W 24/10* (2013.01)

(58) Field of Classification Search
CPC ....... H04W 88/06; H04W 24/10; G01S 11/06; G01S 5/0027; G01S 3/14; G01S 5/0284; G01S 5/0252; G01S 5/021; G01S 5/0226; G01S 5/0242; G06F 21/629; G06F 2221/2111; H04M 1/72457; H04N 1/32512; H04N 1/32587
See application file for complete search history.

(56) References Cited

U.S. PATENT DOCUMENTS

| | | | | |
|---|---|---|---|---|
| 9,794,942 | B1* | 10/2017 | Arrakoski | G01S 5/0027 |
| 10,044,847 | B2* | 8/2018 | Economy | H04M 1/72409 |
| 10,928,481 | B2* | 2/2021 | Oue | G01S 5/14 |
| 2004/0246129 | A1* | 12/2004 | Goggin | G08B 21/24 |
| | | | | 340/539.23 |
| 2017/0188129 | A1* | 6/2017 | Sindia | H03G 3/3005 |
| 2017/0236390 | A1* | 8/2017 | Herschkowitz | G08B 7/06 |
| | | | | 340/539.12 |
| 2017/0339519 | A1* | 11/2017 | Buck, Jr. | G08B 25/08 |
| 2018/0324553 | A1* | 11/2018 | Zhou | H04W 4/024 |
| 2018/0359623 | A1* | 12/2018 | Kim | G01S 19/34 |
| 2019/0373658 | A1* | 12/2019 | Ko | H04W 4/80 |
| 2021/0250909 | A1* | 8/2021 | Kobayashi | H04W 76/11 |

FOREIGN PATENT DOCUMENTS

| | | | | |
|---|---|---|---|---|
| CN | 105847509 A | * | 8/2016 | ........ H04M 1/27457 |
| JP | 2016-217931 A | | 12/2016 | |

\* cited by examiner

FIG. 1
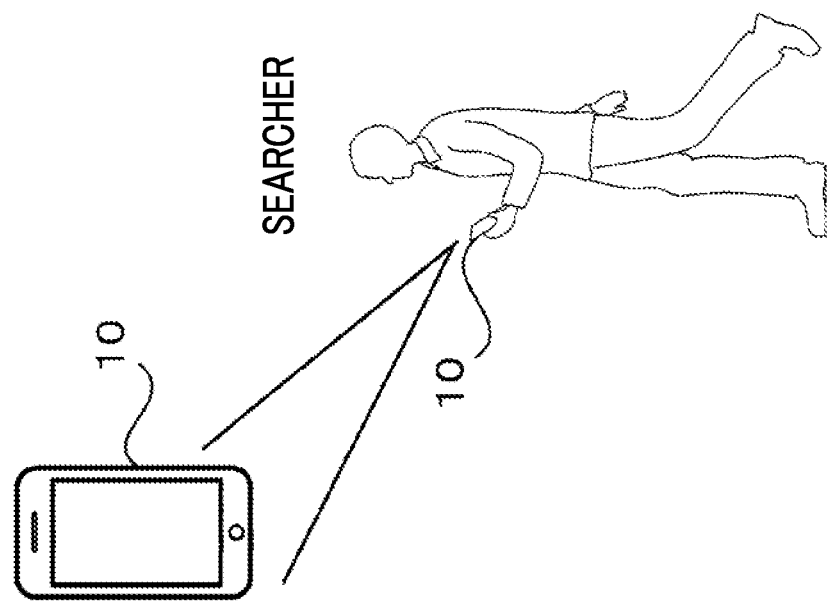
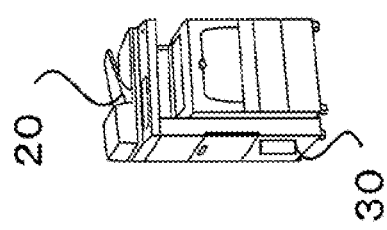

FIG. 7

| PORTABLE TERMINAL DEVICE NUMBER | POSITION INFORMATION | RADIO FIELD INTENSITY (dBm) | DISTANCE TO PORTABLE TERMINAL DEVICE (m) |
|---|---|---|---|
| PORTABLE TERMINAL DEVICE 10 | (139° 44' 55", 35° 49' 18") | −40 | 575.9 |
| PORTABLE TERMINAL DEVICE 41 | (139° 44' 19", 36° 49' 55") | −51 | 856.2 |
| PORTABLE TERMINAL DEVICE 42 | (139° 12' 23", 35° 59' 49") | −59 | 1225.3 |

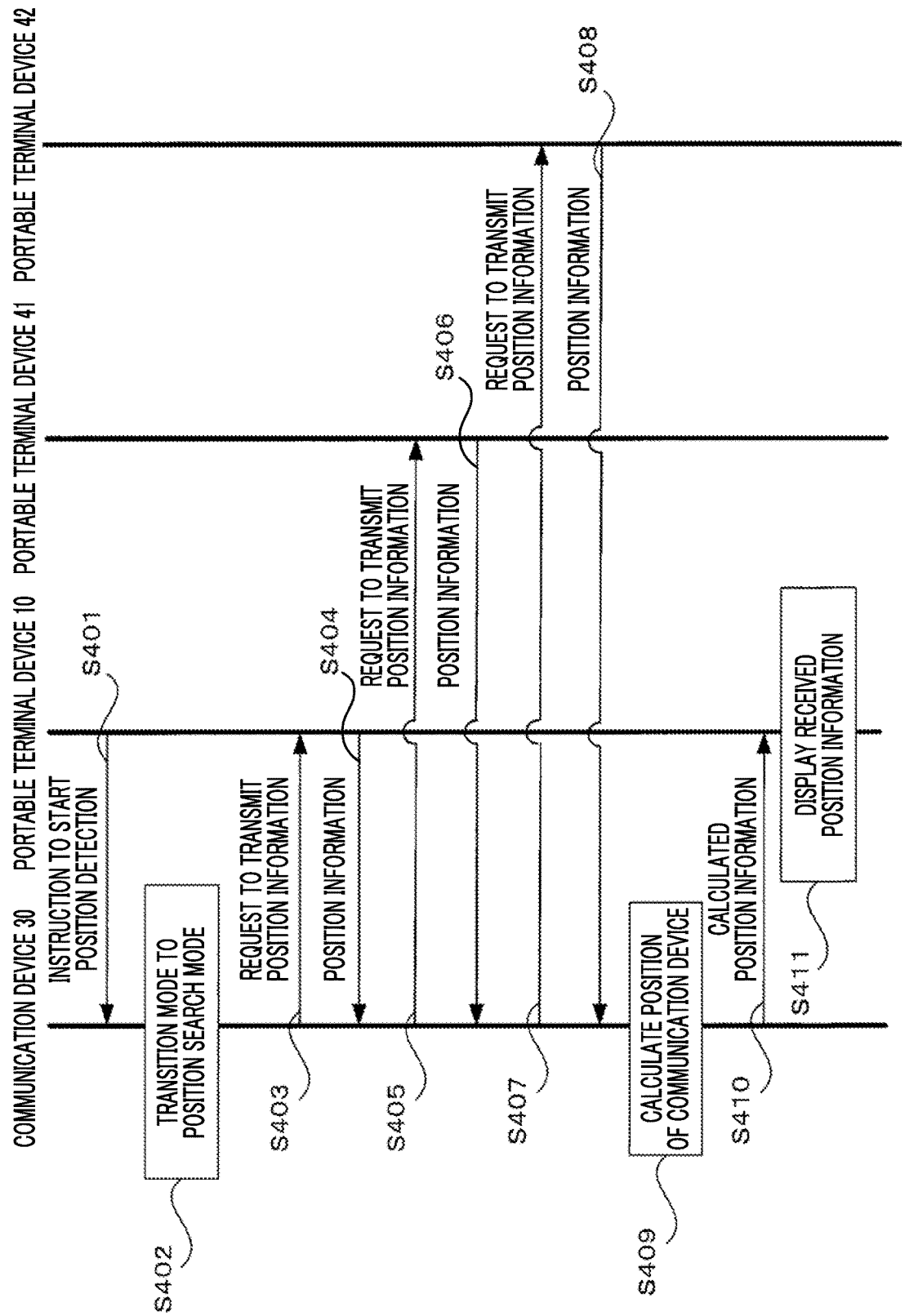

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is a continuation of U.S. patent application Ser. No. 16/541,316 filed Aug. 15, 2019, which claims priority to Japanese Patent Application No. 2019-027281 filed Feb. 19, 2019, all of which are hereby incorporated by reference in their entirety.

BACKGROUND

(i) Technical Field

The present disclosure relates to an information processing apparatus, an information processing system, and a non-transitory computer readable medium.

(ii) Related Art

JP-A-2016-217931 discloses a moving object search method as follows. In the moving object search method, in order to search for the position of a beacon device that transmits a beacon signal, information regarding field intensity of the beacon signal is received from plural portable terminals that receives the beacon signal from the beacon device, and information on the position of the beacon device as a search target is calculated based on the distance between each of the portable terminals and the beacon device.

SUMMARY

Aspects of non-limiting embodiments of the present disclosure relate to providing an information processing apparatus, an information processing system, and a non-transitory computer readable medium, which make it possible to search for the position of the information processing apparatus as a search target even when the information processing apparatus is located at a place where any wireless communication channel for high accuracy searching is not available.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a first receiving unit that receives a radio signal including position information from a portable terminal device through a first wireless communication channel; a second receiving unit that receives a radio signal including position information from a portable terminal device through a second wireless communication channel in which position measurement accuracy and radio wave reachable range are higher and shorter respectively than those in the first wireless communication channel; a calculation unit that calculates information on position of the information processing apparatus by using field intensity of each of plural radio signals received by the first receiving unit or the second receiving unit and by using the position information included in each of the radio signals; a transmission unit that transmits the position information calculated by the calculation unit to a portable terminal device from which an instruction to start position detection has been transmitted, through the first wireless communication channel; and a control unit that receives the instruction to start the position detection from the portable terminal device, causes the calculation unit to calculate the information on the position of the information processing apparatus based on the radio signal received by the first receiving unit, and, when a preset condition is satisfied, performs switching control to cause the calculation unit to calculate the information on the position of the information processing apparatus based on the radio signal received by the second receiving unit.

BRIEF DESCRIPTION OF THE DRAWINGS

Exemplary embodiments of the present invention will be described in detail based on the following figures, wherein:

FIG. 1 is a diagram illustrating a system configuration of a position search system according to an exemplary embodiment of the present disclosure;

FIG. 7 is a diagram illustrating an example of information stored in a data storage unit;

FIG. 12 is a sequence chart illustrating an operation in a case where position detection is performed through the LPWA channel.

DETAILED DESCRIPTION

Figure 2:
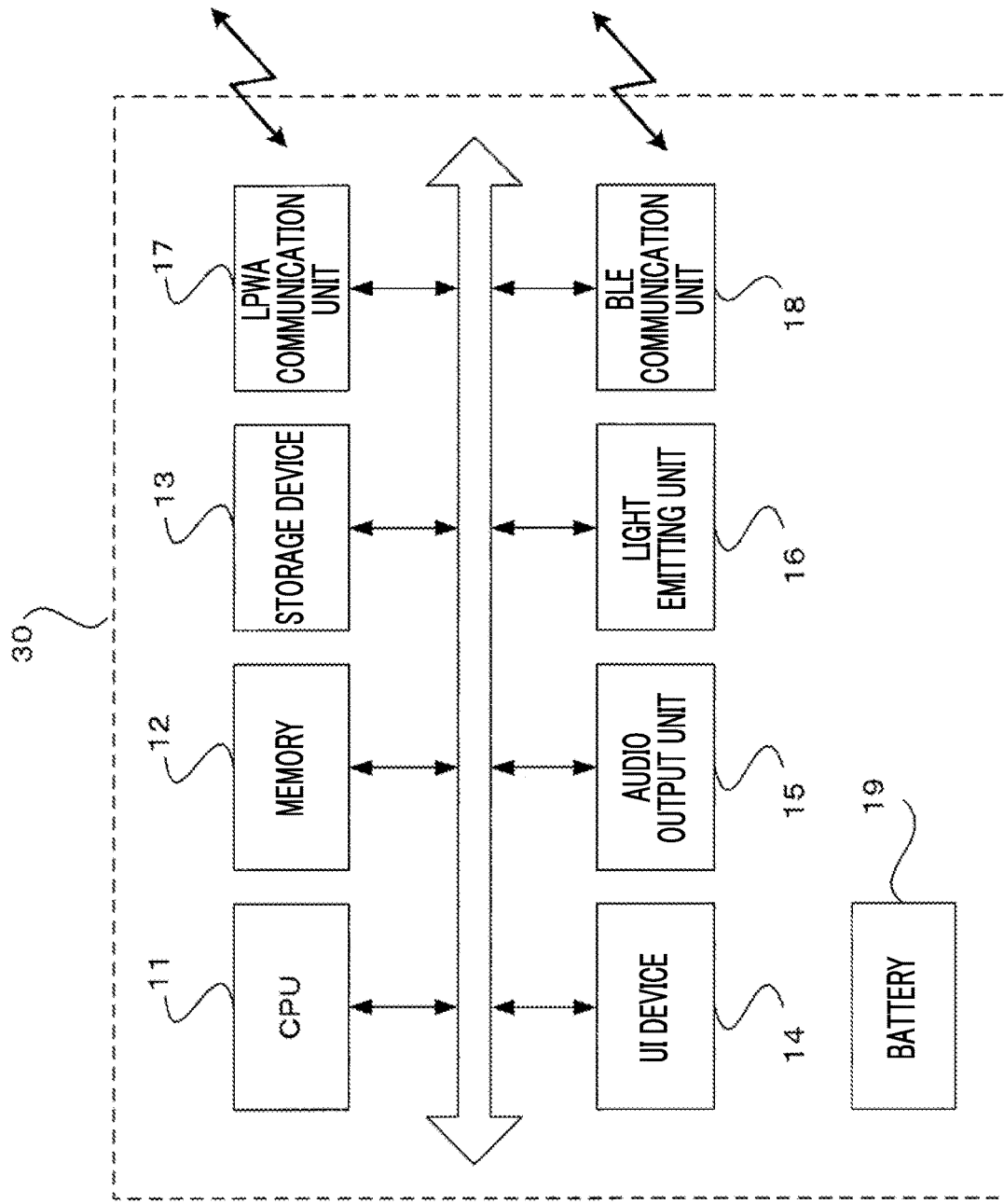
FIG. 2 is a block diagram illustrating a hardware configuration of a communication device in the exemplary embodiment of the present disclosure.

An exemplary embodiment of the present disclosure will be described in detail with reference to the drawings.

FIG. 1 is a diagram illustrating a system configuration of a position search system according to an exemplary embodiment of the present disclosure.

The position search system in the exemplary embodiment of the present disclosure includes a search target apparatus 20 and a portable terminal device 10 operated by a searcher, as illustrated in FIG. 1.

The position search system in the exemplary embodiment is used, for example, in a case of searching for office machines such as a printer having an unknown location due to loss or theft and various devices and finding the devices.

In the position search system in the exemplary embodiment, a case where a searcher holding the portable terminal device 10 finds the search target apparatus 20 illustrated in FIG. 1 will be described.

Here, a communication device 30 is attached to the search target apparatus 20. The communication device 30 corresponds to an information processing apparatus which is driven by a battery or the like and is attached in advance to an apparatus having a location which may be unknown. The communication device 30 has a communication function through a low power wide area (LPWA) channel being a power saving wide area wireless communication channel and a communication function through a Bluetooth (registered trademark) low energy (BLE) channel.

The LPWA is also referred to as a low power wide area network (LPWAN), and is a wireless communication channel in which performing high speed communication is not possible, but transmission and reception of data are possible in a wide area with low power consumption.

Specifically, with such a LPWA, data can be transmitted and received using a radio wave in, for example, a 920 MHz band, and data can be transmitted and received between apparatuses separated by a distance of several kilometers to several tens of kilometers. In addition, even when power is supplied to the communication device 30 from a battery, low power consumption can be achieved so that the operation can be continued for a period on the order of years, such as 5 to 10 years.

The portable terminal device 10 held by the searcher includes, for example, a smart phone. The portable terminal device 10 has a function of performing communication with a LPWA channel and performing communication with a BLE channel.

The radio wave reachable range in the LPWA channel has a long distance of several kilometers to several tens of kilometers as described above. Thus, it is possible to search for the position of the search target apparatus 20 in a wide area by using radio waves in the LPWA channel. In search using the radio wave in the LPWA channel, it is not possible to perform position search with high accuracy because the radio wave reachable range is long.

Although the radio wave reachable range in the BLE channel is shorter than that in the LPWA channel, the position of the search target apparatus 20 can be measured with higher accuracy by using BLE channel radio waves than by using LPWA channel radio waves.

FIG. 2 illustrates a hardware configuration of the communication device 30 in the position search system in the exemplary embodiment.

As illustrated in FIG. 2, the communication device 30 includes a CPU 11, a memory 12, a storage device 13 such as a flash memory, a user interface (abbreviated as UI) device 14, an audio output unit 15, a light emitting unit 16, an LPWA communication unit 17, and a BLE communication unit 18. The components are connected to each other via a control bus.

The communication device 30 further includes a battery 19. The components as described above operate by the power supplied by the battery 19.

The CPU 11 controls the operation of the communication device 30 by performing predetermined processing based on a control program stored in the memory 12 or the storage device 13. In the exemplary embodiment, descriptions will be made on the assumption that the CPU 11 reads and executes the control program stored in the memory 12 or the storage device 13. However, the program may be stored in a storage medium such as a CD-ROM and be provided to the CPU 11.

Figure 3:
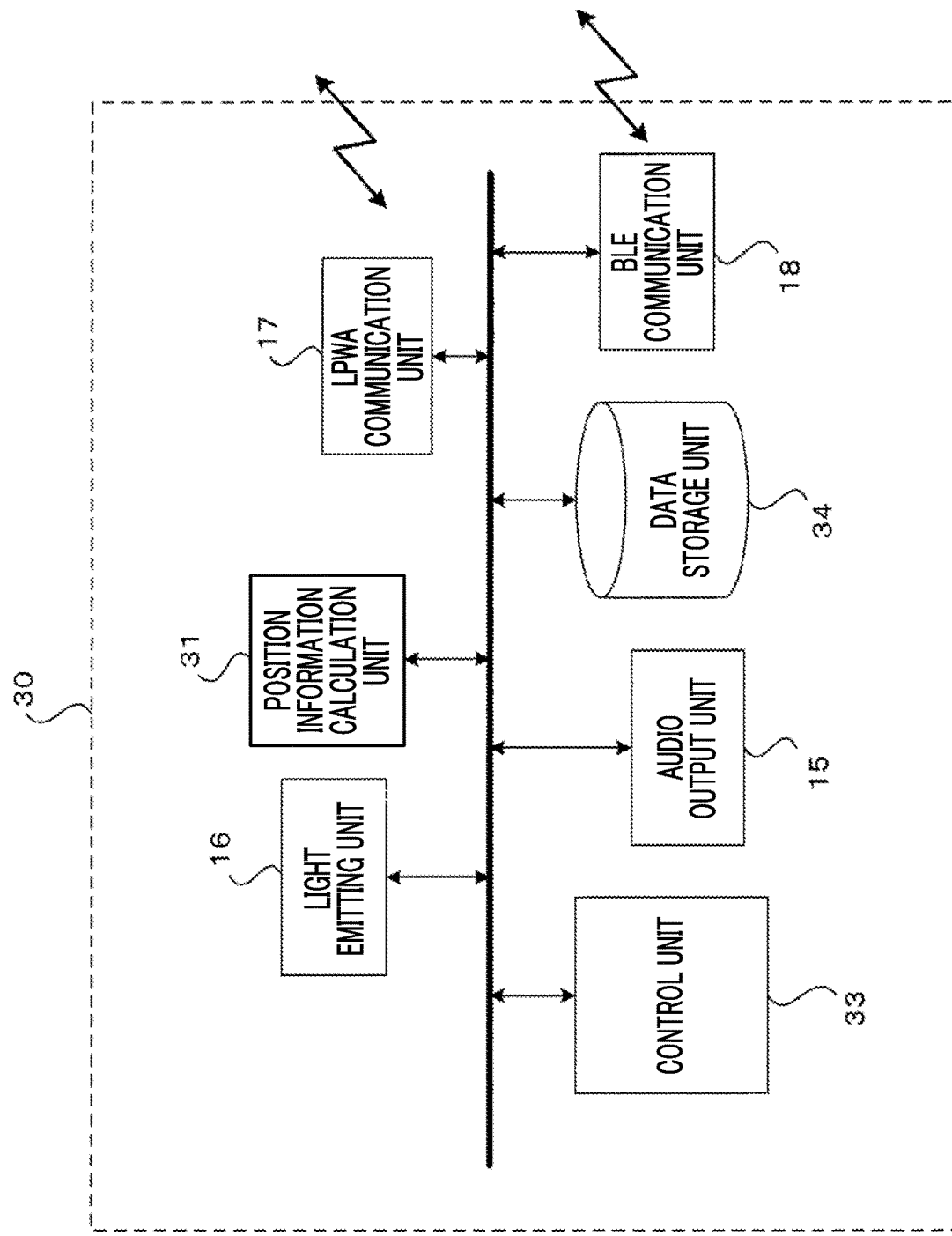
FIG. 3 is a block diagram illustrating a functional configuration of the communication device in the exemplary embodiment of the present disclosure.

FIG. 3 is a block diagram illustrating a functional configuration of the communication device 30 realized by executing the control program.

As illustrated in FIG. 3, in the exemplary embodiment, the communication device 30 includes an audio output unit 15, a light emitting unit 16, an LPWA communication unit 17, a BLE communication unit 18, a position information calculation unit 31, a control unit 33, and a data storage unit 34.

The light emitting unit 16 includes, for example, an LED or the like, and emits light under control of the control unit 33. The audio output unit 15 includes, for example, a speaker, and performs audio output based on control of the control unit 33.

The LPWA communication unit 17 transmits and receives data to and from the portable terminal device 10 through the LPWA channel. When the position of the communication device 30 is detected, the LPWA communication unit 17 receives a radio signal including position information from the portable terminal device 10 or another portable terminal device through the LPWA channel.

The BLE communication unit 18 transmits and receives data to and from the portable terminal device 10 through the BLE channel. When the position of the communication device 30 is detected, the BLE communication unit 18 receives a radio signal including position information from the portable terminal device 10 or another portable terminal device through the BLE channel.

The position information calculation unit 31 calculates information on the position of the communication device 30 by using field intensity of each of plural radio signals received by the LPWA communication unit 17 or the BLE communication unit 18 and using position information included in each of the radio signal.

Specifically, the position information calculation unit 31 calculates the position of the communication device 30 by a calculation method by a three-point positioning method, for example. The position information calculation unit 31 performs the calculation from pieces of information on the position of at least three points or more, which have been received by the LPWA communication unit 17 or the BLE communication unit 18 and field intensity of the radio signal transmitted from each piece of the position information. Details of the method of calculating the position of the communication device 30 will be described later.

When the control unit 33 receives an instruction to start position detection from a portable terminal device 10 registered in advance through the LPWA channel, the control unit 33 changes the mode to a position search mode and performs negotiation with a portable terminal device capable of LPWA communication. Then, the control unit 33 transmits a request to transmit position information to a portable terminal device capable of communication.

When the control unit 33 receives position information from each portable terminal device, the control unit 33 stores the received position information in the data storage unit 34 along with information on the field intensity of the radio signal when the position information is received.

When position information and the information on the field intensity can be acquired in this manner from three or more portable terminal devices, the control unit 33 performs control to cause the position information calculation unit 31 to calculate the position of the communication device by using the information stored in the data storage unit 34.

The control unit 33 causes the LPWA communication unit 17 to transmit the position information calculated by the position information calculation unit 31 to the portable terminal device 10 which has transmitted the instruction to start position detection, through the LPWA channel.

The control unit 33 receives the instruction to start position detection from the portable terminal device 10, and causes the position information calculation unit 31 to calculate information on the position of the communication device based on the radio signal received by the LPWA communication unit 17. In a case of satisfying a preset condition, the control unit 33 performs switching such that the position information calculation unit 31 calculates the information on the position of the communication device based on the radio signal received by the BLE communication unit 18.

When the distance between the portable terminal device 10 that searches for the position of the communication device and the communication device is equal to or smaller than a preset distance, the control unit 33 may perform switching from calculation of the information on the position of the communication device based on the radio signal received by the LPWA communication unit 17 to calculation of the information on the position of the communication device based on the radio signal received by the BLE communication unit 18.

Alternatively, when the presence of the portable terminal device 10 that searches for the position of the communication device is detected within the range in which communication through the BLE channel is possible, the control unit 33 may perform switching from calculation of the information on the position of the communication device based on the radio signal received by the LPWA communication unit 17 to calculation of the information on the position of the communication device based on the radio signal received by the BLE communication unit 18.

Alternatively, when the control unit 33 receives a switching instruction from the portable terminal device 10, which searches for the position of the communication device, through the BLE channel, the control unit 33 may perform switching from calculation of the information on the position of the communication device based on the radio signal received by the LPWA communication unit 17 to calculation of the information on the position of the communication device based on the radio signal received by the BLE communication unit 18.

As described above, when switching of the calculation method is performed, the control unit 33 performs switching from calculation of the information on the position of the communication device based on the radio signal received by the LPWA communication unit 17 to calculation of the information on the position of the communication device based on the radio signal received by the BLE communication unit 18, only in accordance with the switching instruction from a portable terminal device registered in advance.

Furthermore, when the distance between the portable terminal device 10 that searches for the position of the communication device and the communication device is equal to or smaller than the preset distance, the control unit 33 controls the audio output unit 15 or the light emitting unit 16 to notify the searcher holding the portable terminal device 10 of the position of the communication device by audio output or light emission.

Alternatively, when the number of portable terminal devices capable of receiving a radio signal through the BLE channel after the control unit 33 performs switching to the calculation of the information on the position of the communication device based on the radio signal received by the BLE communication unit 18 is smaller than a preset value, the control unit 33 may control the audio output unit 15 or the light emitting unit 16 to notify the searcher of the position of the communication device by audio output or light emission.

Alternatively, when the control unit 33 receives an audio output instruction or a light emission instruction from the portable terminal device 10 that searches for the position of the communication device, the control unit 33 may control the audio output unit 15 or the light emitting unit 16 to notify the searcher of the position of the communication device by audio output or light emission.

At this time, the control unit 33 controls the audio output unit 15 or the light emitting unit 16 to notify the searcher of the position of the communication device by audio output or light emission, only in accordance with the audio output instruction or the light emission instruction from a portable terminal device registered in advance.

When the portable terminal device 10 searches for a search target apparatus 20 having an unknown location, the portable terminal device 10 transmits an instruction to start position detection to the communication device 30 mounted in the search target apparatus 20. If the portable terminal device 10 receives the position information calculated from the communication device 30, the portable terminal device 10 displays the received position of the search target apparatus 20 to a user. When the portable terminal device 10 approaches the search target apparatus 20 with the position information obtained by position calculation with the LPWA channel, the portable terminal device 10 transmits a switching instruction of performing switching from position calculation with the LPWA channel to position calculation with the BLE channel, to the communication device 30.

In the communication device 30, a portable terminal device that searches for the position of the communication device 30 is registered in advance. Thus, the control unit 33 in the communication device 30 transmits the position information calculated by the position information calculation unit 31 to the portable terminal device registered in advance, in accordance with the instruction to start position detection only from the portable terminal device registered in advance, and the switching instruction to perform switching from position calculation with the LPWA channel to position calculation with the BLE channel.

Next, an operation of the position search system in the exemplary embodiment will be described in detail with reference to the drawings.

Figure 4:
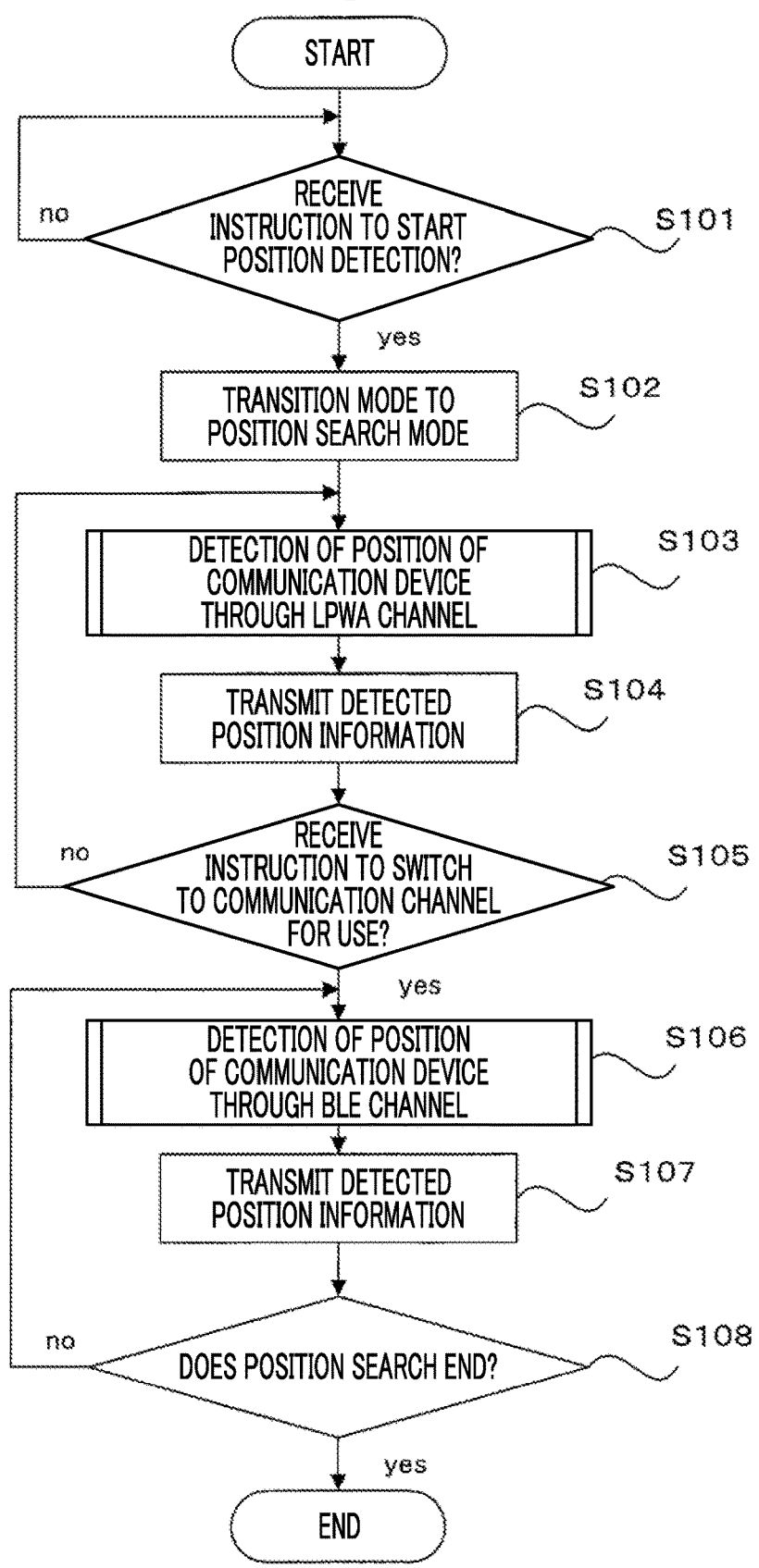
FIG. 4 is a flowchart illustrating an operation of the communication device in the exemplary embodiment of the present disclosure.

First, an operation of the communication device 30 in the position search system in the exemplary embodiment will be described with reference to the flowchart of FIG. 4.

When the searcher operates the portable terminal device 10 to transmit an instruction to start position detection, the communication device 30 receives the instruction to start position detection from the portable terminal device 10 in Step S101, and transitions a mode to a position search mode in Step S102.

Then, in Step S103, the communication device 30 performs position detection of the communication device 30 with the LPWA channel. In Step S104, the communication device 30 transmits information on the position of the detected communication device to the portable terminal device 10 through the LPWA channel.

The communication device 30 determines whether or not to receive a switching instruction of a communication channel to be used, in Step S105. The communication device 30 continues the position detection through the LPWA channel until the communication device 30 receives a switching instruction of a communication channel to be used, from the portable terminal device 10.

When the communication device 30 receives the switching instruction of a communication channel to be used, from the portable terminal device 10, in Step S105, the communication device 30 performs switching from position detection through the LPWA channel to position detection through the BLE channel.

That is, in Step S106, the communication device 30 performs detection of the position of the communication device 30 through the BLE channel. In Step S107, the communication device 30 transmits the information on the position of the detected communication device 30 to the portable terminal device 10 through the BLE channel.

In Step S108, the communication device 30 determines whether or not to receive an instruction to end the position search from the portable terminal device 10. The communication device 30 continues the position detection through the BLE channel until the position search end instruction is received.

Next, details of position detection processing through the LPWA channel in Step S103 in the flowchart in FIG. 4 will be described with reference to the flowchart in FIG. 5.

First, in Step S201, the communication device 30 searches for a portable terminal device capable of communication with the LPWA channel.

When it is determined that the portable terminal device capable of communication is provided, in Step S202, the communication device 30 transmits a request to transmit the position information to the portable terminal device in Step S203.

When receiving, from the communication device 30, the request to transmit the position information, the portable terminal device turns from a normal mode into a position information transmission mode in which transmission of the position information is performed. Thus, the portable terminal device transmits position information obtained by a global positioning system (GPS) device or the like, to the communication device 30.

When the portable terminal device transmits position information to the communication device 30, in Step S204, the communication device 30 receives the position information transmitted from the portable terminal device. Then, in Step S205, the communication device 30 stores the position information and the information of the field intensity of the radio signal of the portable terminal device in a case of receiving the position information, in the data storage unit 34.

In Step S206, the communication device 30 repeats the processes of Steps S201 to S205. When it is determined that pieces of information on the position of three or more places and the information of the field intensity have been received, the position information calculation unit 31 calculates information on the position of the communication device 30 by using the stored information, in Step S207.

Figure 6:
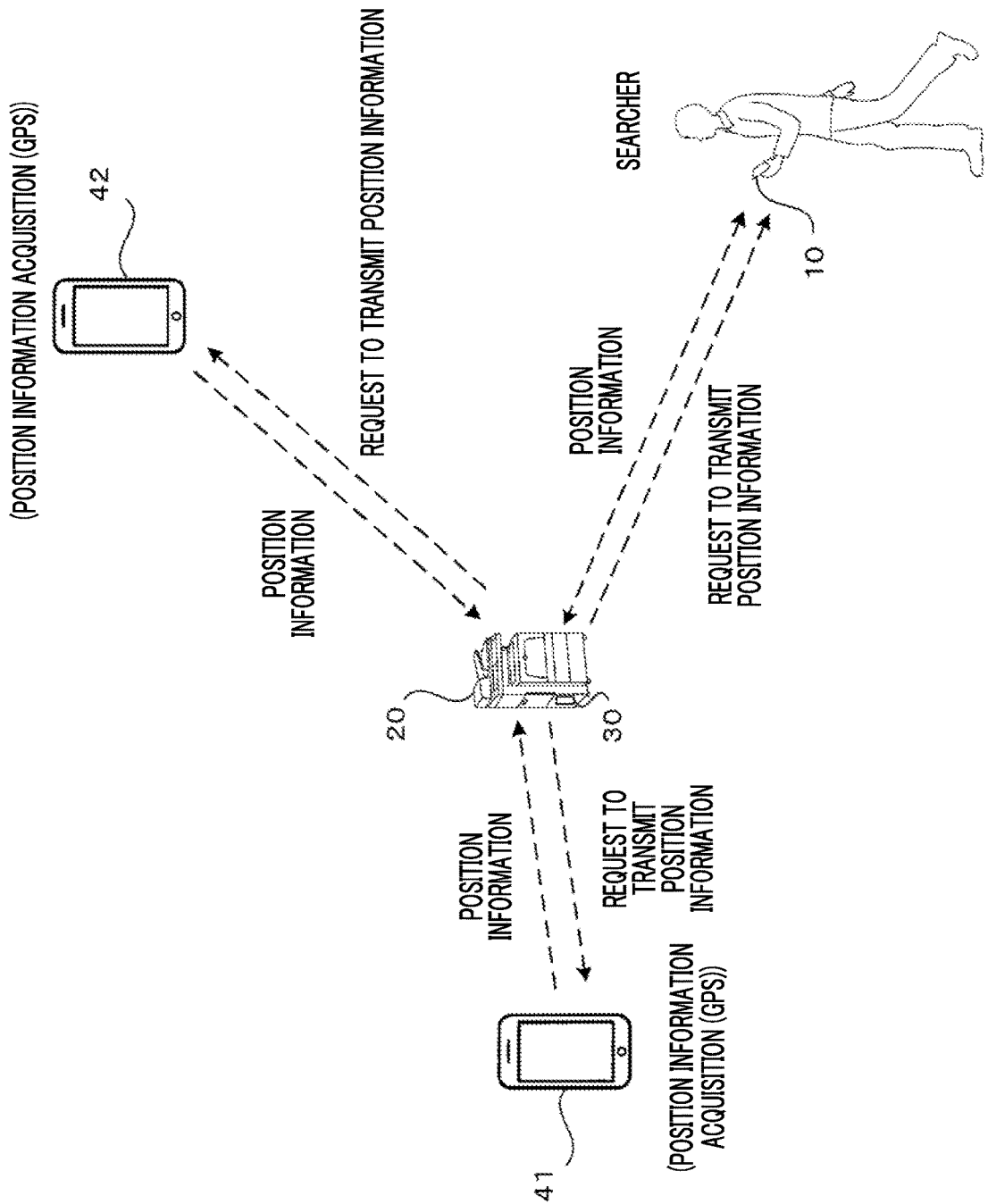
FIG. 6 is a diagram illustrating a form in a case where position detection is performed through the LPWA channel.

FIG. 6 illustrates a form in which position detection through the LPWA channel is performed in this manner.

FIG. 6 illustrates a form in which the communication device 30 mounted in the search target apparatus 20 receives position information from the portable terminal device 10 held by the searcher and two portable terminal devices 41 and 42 other than the portable terminal device 10.

Firstly, the communication device 30 performs negotiation with the portable terminal devices 10, 41, 42 to establish communication. Then, the communication device 30 transmits a request to transmit position information to the portable terminal devices 10, 41, 42. The communication device 30 turns into a reception waiting state for receiving the transmitted position information. Thus, the communication device 30 receives the position information transmitted from the portable terminal devices 10, 41, and 42.

In the communication device 30, the position information received from the portable terminal devices 10, 41, and 42 in this manner and the information of field intensity in a case of receiving the position information are stored in the data storage unit 34.

FIG. 7 illustrates an example of the information stored in the data storage unit 34 in this manner.

In the example of the stored information illustrated in FIG. 7, a form in which the portable terminal device number, the position information, the field intensity, and the information of the distance to the portable terminal device estimated from the field intensity are stored in association with each other is shown.

Here, in the communication device 30, the field intensity of the received radio signal is converted into distance information, and a distance to the portable terminal device is estimated based on the field intensity. Specifically, in the communication device 30, the field intensity may be converted into distance information based on a preset calculation expression, or by using a correspondence relationship table between field intensity and distance measured in advance.

The position information calculation unit 31 in the communication device 30 calculates the position of the communication device 30 so long as the communication device 30 can acquire three or more sets of the position information and the distance as described above. Regarding the calculation of the position, for example, a calculation method by three-point positioning as illustrated in FIG. 8 can be used.

Figure 8:
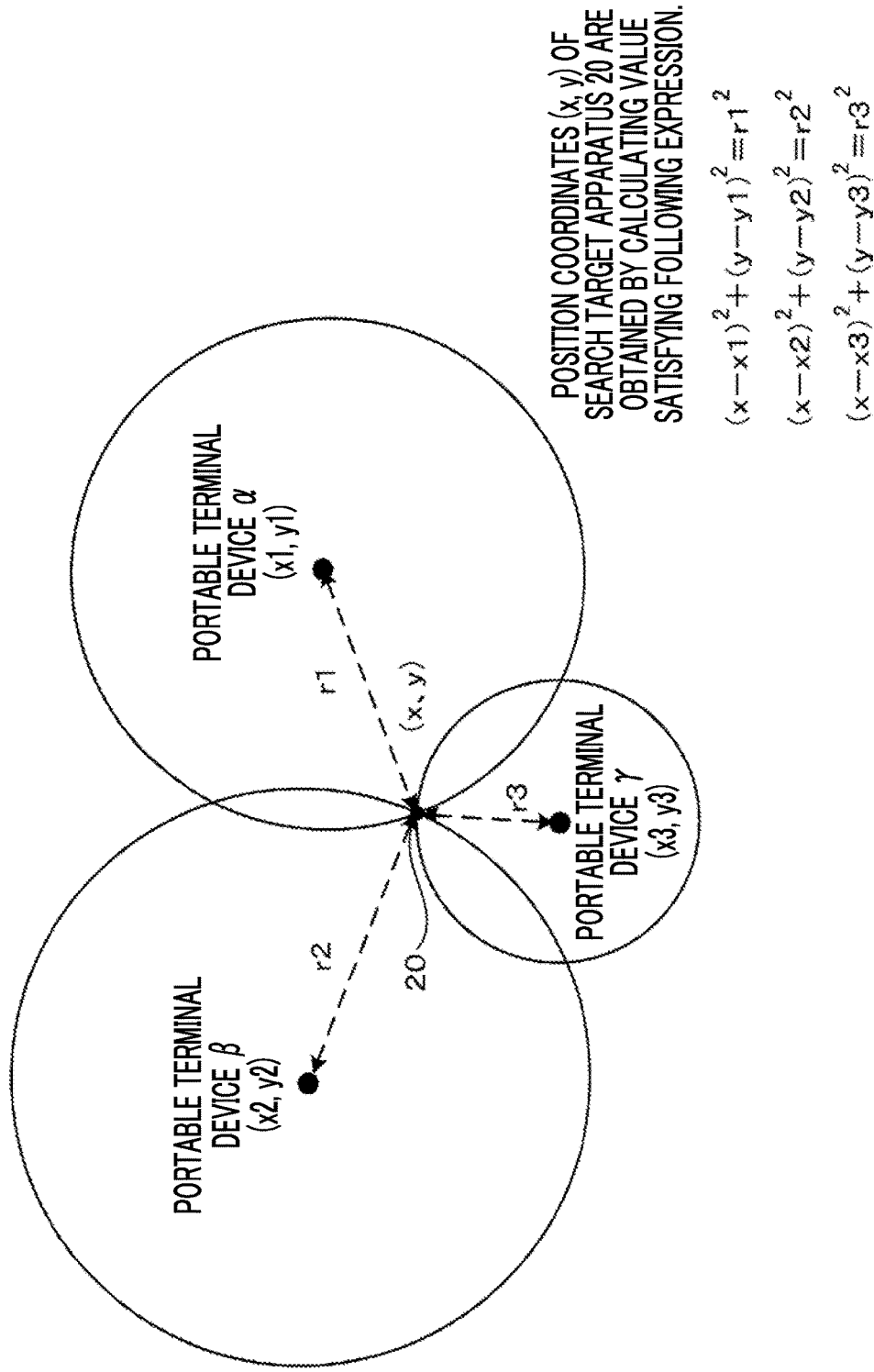
FIG. 8 is a diagram illustrating a specific example of a calculation method in a case where the position of a search target apparatus is calculated.

The calculation method illustrated in FIG. 8 is a calculation method by three-point positioning. FIG. 8 illustrates an example of a case where the position of the search target apparatus 20 in which the communication device 30 is mounted is calculated based on the position of each of three portable terminal devices α, β, and γ and the distance from each of the three portable terminal devices α, β, and γ.

Here, when the position coordinates of the portable terminal device α are set to (x1, y1), a distance from the communication device 30 to the portable terminal device α is set to r1, the position coordinates of the portable terminal device β are set to (x2, y2), a distance from the communication device 30 to the portable terminal device β is set to r2, the position coordinates of the portable terminal device γ are set to (x3, y3), and a distance from the communication device 30 to the portable terminal device γ is set to r3, the position coordinates (x, y) of the search target apparatus 20 are obtained by calculating a value satisfying the following expression.

$$(x-x1)^2+(y-y1)^2=r1^2$$

$$(x-x2)^2+(y-y2)^2=r2^2$$

$$(x-x3)^2+(y-y3)^2=r3^2$$

The information on the position of the search target apparatus 20 calculated in this manner is transmitted from the communication device 30 to the portable terminal device 10 and is displayed on a display of the portable terminal device 10.

Figure 9B:
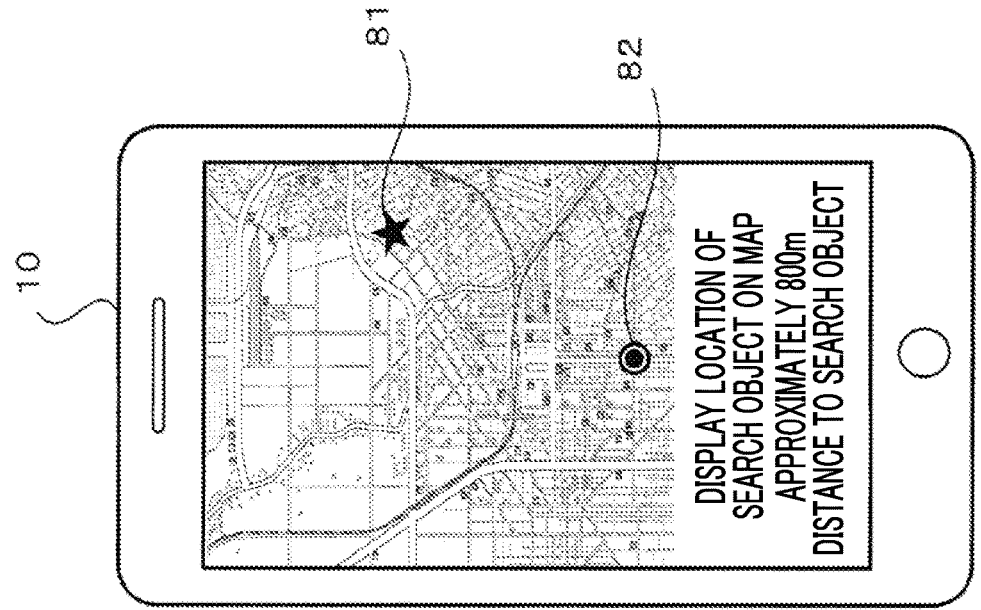
FIGS. 9A and 9B are views shown an example of a display screen in a portable terminal device in a case where calculated information on the position of the search target apparatus is displayed.
Figure 9A:
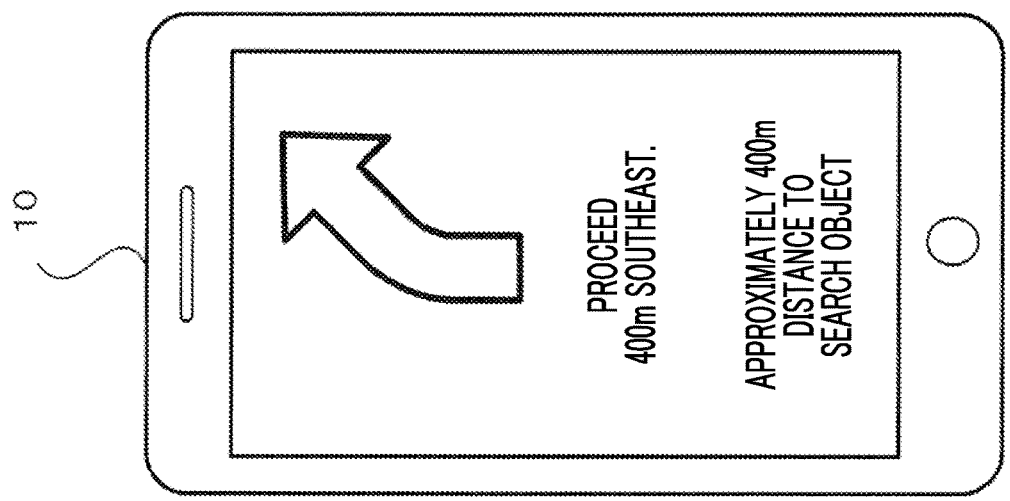

FIGS. 9A and 9B illustrate an example of a display screen in the portable terminal device 10, which is displayed in this manner.

FIG. 9A illustrates an example of a case where a moving direction to the search target apparatus 20, a moving distance, and the remaining distance to the search target apparatus 20 are displayed to the searcher.

FIG. 9B illustrates an example of the display screen in a case where the position 81 of the search target apparatus 20 is displayed on a map by an asterisk, and the position 82 of the portable terminal device 10 is displayed on the map by a double circle.

In a case where such display is performed, the portable terminal device 10 may detect the direction in which the searcher is currently directed, by using an acceleration sensor, a geomagnetic sensor, a gyro sensor, and the like. In addition, the portable terminal device 10 may display the moving direction in which the moving is to be performed, to the searcher based on the detected direction of the searcher being directed and a direction to the position of the search target apparatus 20.

The searcher can approach the position of the search target apparatus 20 by referring to such a display screen.

When the communication device 30 detects that the distance between the portable terminal device 10 held by the searcher and the communication device 30 becomes within a preset distance, for example, within 100 m, the communication device 30 can notify the portable terminal device 10 that the distance becomes within the preset distance.

Figure 10:
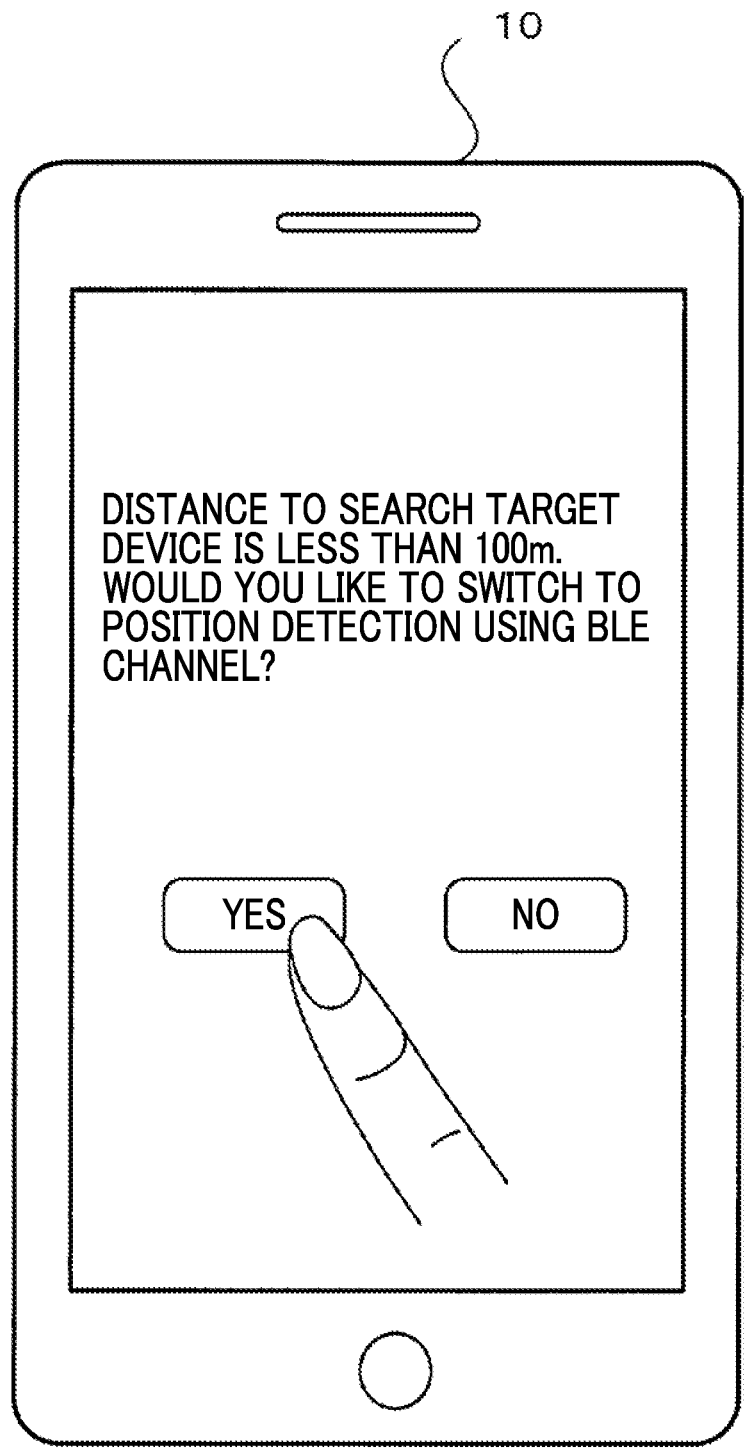
FIG. 10 is a diagram illustrating an example of a display screen displayed in the portable terminal device that receives a notification from the communication device.

Then, in the portable terminal device 10 which has received the notification from the communication device 30, for example, a display screen as illustrated in FIG. 10 is displayed to notify the searcher of the notification.

When the searcher selects switching from position detection using the LPWA channel to position detection using the BLE channel, the portable terminal device 10 transmits the switching instruction of a communication channel to be used in a case of position detection, to the communication device 30.

The communication device 30 switches the position detection using the LPWA channel to the position detection using the BLE channel.

Next, details of position detection processing using the BLE channel in Step S106 in the flowchart in FIG. 4 will be described with reference to the flowchart in FIG. 11.

Figure 5:
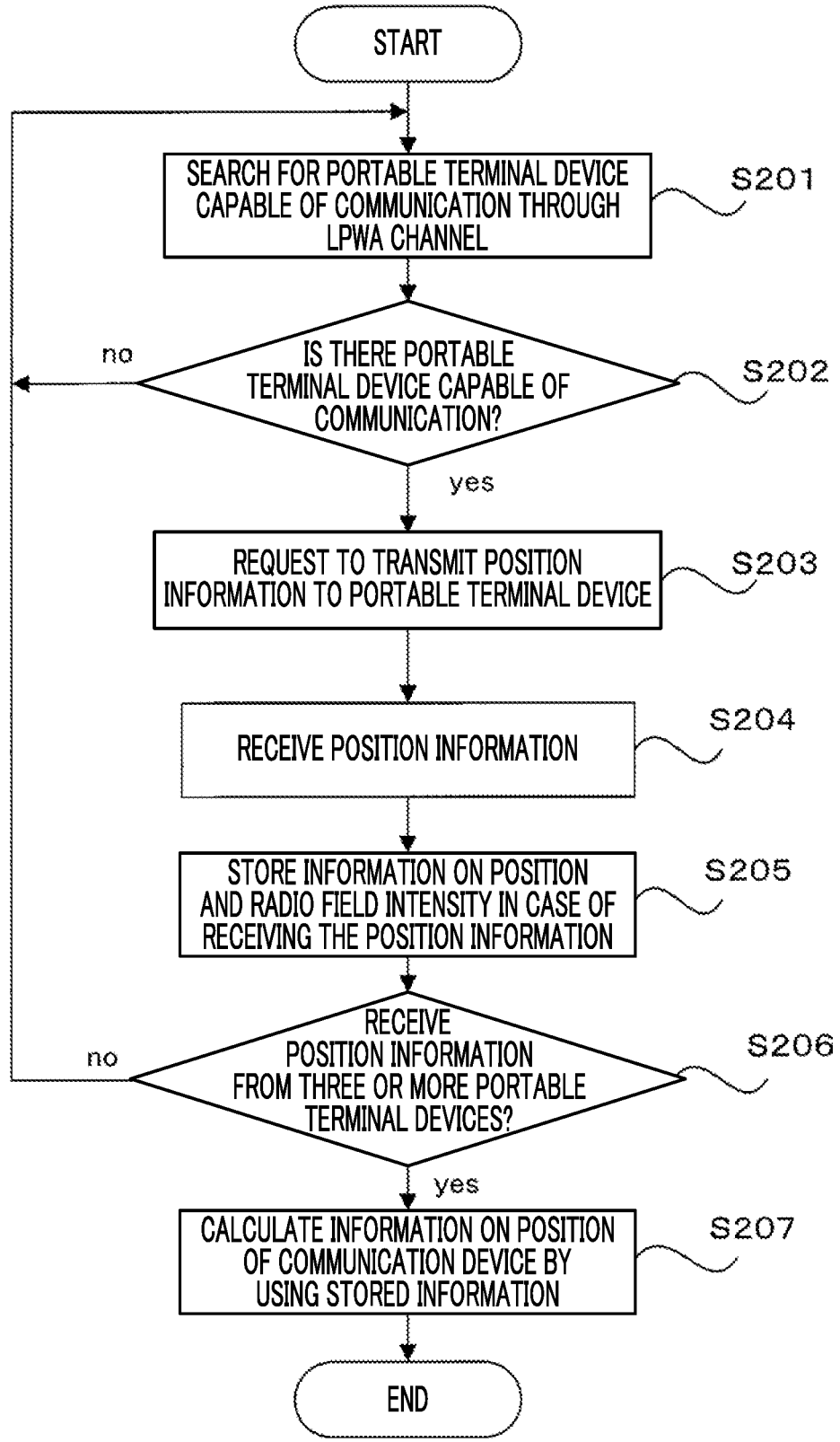
FIG. 5 is a flowchart illustrating details of position detection processing using a LPWA channel in Step S103 in the flowchart in FIG. 4.
Figure 11:
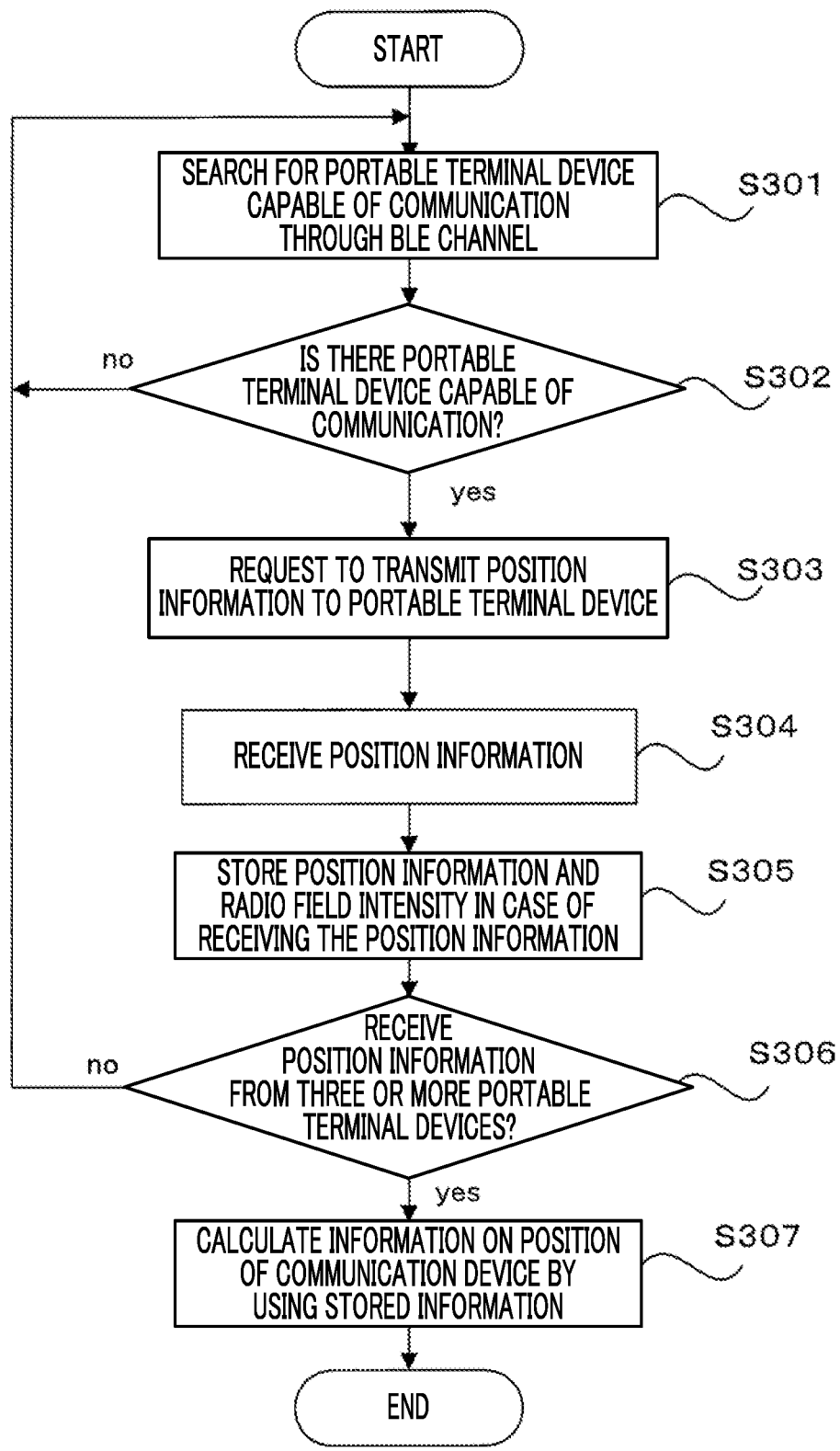
FIG. 11 is a flowchart illustrating details of position detection processing using a BLE channel in Step S106 in the flowchart in FIG. 4.

The processes of Steps S301 to S307 in the flowchart illustrated in FIG. 11 are similar to the processes of Steps S201 to S207 in the flowchart illustrated in FIG. 5 except that the communication channel to be used is different. Thus, descriptions thereof will not be repeated.

The radio wave reachable range through the BLE channel is shorter than that through the LPWA channel. Thus, there is a high possibility that three or more portable terminal devices are not present in the range where BLE communication is possible for the search target apparatus 20.

Therefore, if the position detection is not possible through the BLE channel, the communication device 30 may cause the light emitting unit 16 to emit light or cause the audio output unit 15 to output sound so that the searcher supposed to come close can find the search target apparatus 20.

Finally, an operation in a case where the position detection using the LPWA channel described above is performed will be described with reference to the sequence chart in FIG. 12.

When the portable terminal device 10 transmits an instruction to start position detection to the communication device 30, in Step S401, the communication device 30 transitions the mode to the position search mode in Step S402.

The communication device 30 searches for portable terminal devices in the range in which communication by radio waves in the LPWA channel is allowed. In Steps S403, S405, and S407, the communication device 30 transmits a request to transmit position information to the portable terminal device capable of communication. In Steps S404, S406, and S408, the communication device 30 acquires position information from each portable terminal device capable of communication.

In Step S409, the communication device 30 calculates the information on the position of the communication device 30 based on the acquired three pieces of position information and the information of a distance from the communication device 30 to the portable terminal device in a case of acquiring the position information. In Step S410, the communication device 30 transmits the calculated position information to the portable terminal device 10.

The portable terminal device 10 which receives the position information from the communication device 30 displays the received position information in the display or the like in Step S411.

MODIFICATION EXAMPLE

The above exemplary embodiment has been described using the case where the position of the search target apparatus is searched by a portable terminal device such as a smartphone. However, the present disclosure is not limited to this case, and the present disclosure can be similarly applied to a case where the position of the search target apparatus is searched by various information processing apparatuses other than the portable terminal device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to act as:
a first receiving unit that receives a radio signal including position information directly emitted from an apparatus through a first wireless communication channel, the first wireless communication channel being a low power wide area (LPWA) channel where data is transmitted and received via a radio wave in a frequency band including a 920 MHz band;
a second receiving unit that receives a radio signal including position information from an apparatus through a second wireless communication channel in which position measurement accuracy and radio wave reachable range are higher and shorter respectively than those in the first wireless communication channel;
a calculation unit that calculates a position of the information processing apparatus by using field intensity of each of a plurality of radio signals received by the first receiving unit or the second receiving unit and by using the position information included in each of the radio signals; and a control unit that:
receives an instruction to start a position detection,
causes the calculation unit to calculate the position of the information processing apparatus based on at least three separate radio signals received by the first receiving unit, and
if a preset condition is satisfied, performs switching control to cause the calculation unit to calculate the position of the information processing apparatus based on at least three separate radio signals received by the second receiving unit,
wherein, if the control unit receives a switching instruction from an apparatus that searches for a position of the information processing apparatus through the second wireless communication channel, the control unit determines whether the apparatus that sent the switching instruction is a pre-registered device, and based on a result of the determination, the control unit performs switching from calculation of the position of the information processing apparatus based on the at least three separate radio signals received by the first receiving unit to calculation of the position of the information processing apparatus based on the at least three separate radio signals received by the second receiving unit.

2. The information processing apparatus according to claim 1, wherein
if a distance between the information processing apparatus and an apparatus that searches for a position of the information processing apparatus is equal to or shorter than a preset distance, the control unit performs switching from calculation of the position of the information processing apparatus based on the at least three separate radio signals received by the first receiving unit to calculation of the position of the information processing apparatus based on the at least three separate radio signals received by the second receiving unit.

3. The information processing apparatus according to claim 1, wherein
if presence of an apparatus that searches for a position of the information processing apparatus is detected within a range in which communication through the second wireless communication channel is possible, the control unit performs switching from calculation of the position of the information processing apparatus based on the at least three separate radio signals received by the first receiving unit to calculation of the position of the information processing apparatus based on the at least three separate radio signals received by the second receiving unit.

4. The information processing apparatus according to claim 1, wherein
if a distance between the information processing apparatus and an apparatus that searches for a position of the information processing apparatus is equal to or shorter than a preset distance, the control unit notifies a searcher of the position of the information processing apparatus by audio output or light emission.

5. The information processing apparatus according to claim 1, wherein
if a number of apparatuses capable of receiving the radio signal through the second wireless communication channel is smaller than a preset value after the control unit performs switching to calculation of the position of the information processing apparatus based on the at least three separate radio signals received by the second receiving unit, the control unit notifies a searcher of the position of the information processing apparatus by audio output or light emission.

6. The information processing apparatus according to claim 1, wherein
if the control unit receives an instruction from an apparatus that searches for a position of the information processing apparatus, the control unit notifies a searcher of the position of the information processing apparatus by audio output or light emission.

7. The information processing apparatus according to claim 1, wherein
only in response to the determination that the apparatus that sent the switching instruction is the pre-registered device, the control unit performs the switching from calculation of the position of the information processing apparatus based on the at least three separate radio signals received by the first receiving unit to calculation of the position of the information processing apparatus based on the at least three separate radio signals received by the second receiving unit.

8. An information processing system comprising:
an information processing apparatus including:
a processor programmed to act as:
a first receiving unit that receives a radio signal including position information directly emitted from an apparatus through a first wireless communication channel, the first wireless communication channel being a low power wide area (LPWA) channel where data is transmitted and received via a radio wave in a frequency band including a 920 MHz band;
a second receiving unit that receives a radio signal including position information from an apparatus through a second wireless communication channel in which position measurement accuracy and radio wave reachable range are higher and shorter respectively than those in the first wireless communication channel;
a calculation unit that calculates a position of the information processing apparatus by using field intensity of each of a plurality of radio signals received by the first receiving unit or the second receiving unit and by using the position information included in each of the radio signals; and
a control unit that:
receives an instruction to start a position detection,
causes the calculation unit to calculate the position of the information processing apparatus based on at least three separate radio signals received by the first receiving unit, and
if a preset condition is satisfied, performs switching control to cause the calculation unit to calculate the position of the information processing apparatus based on at least three separate radio signals received by the second receiving unit; and
an apparatus that
transmits, to the information processing apparatus as a search target, the instruction to start the position detection and a switching instruction to perform switching from calculation of the position of the information processing apparatus based on the at least three separate radio signals received by the first receiving unit to calculation of the position of the information processing apparatus based on the at least three separate radio signals received by the second receiving unit, and
receives the calculated position from the information processing apparatus as the search target,
wherein, if the control unit receives a switching instruction from an apparatus that searches for a position of the information processing apparatus through the second wireless communication channel, the control unit determines whether the apparatus that sent the switching instruction is a pre-registered device, and based on a result of the determination, the control unit performs switching from calculation of the position of the information processing apparatus based on the at least three separate radio signals received by the first receiving unit to calculation of the position of the information processing apparatus based on the at least three separate radio signals received by the second receiving unit.

9. The information processing system according to claim 8, wherein
the apparatus that searches for the position of the information processing apparatus is registered in advance in the information processing apparatus, and
the control unit transmits the position calculated by the calculation unit to the registered apparatus in accordance with an instruction to start position detection from the registered apparatus and the switching instruction to perform switching from calculation of the position of the information processing apparatus based on the at least three separate radio signals received by the first receiving unit to calculation of the position of the information processing apparatus based on the at least three separate radio signals received by the second receiving unit.

10. A non-transitory computer readable medium storing a program causing a computer to execute an information processing process, the process comprising:
a first receiving step of receiving an instruction to start position detection from an apparatus and receiving a radio signal including position information directly emitted from the apparatus through a first wireless communication channel, the first wireless communication channel being a low power wide area (LPWA) channel where data is transmitted and received via a radio wave in a frequency band including a 920 MHz band;
a first calculation step of calculating a position of an information processing apparatus by using field intensity of each of a plurality of radio signals received in the first receiving step and by using position information included in each of the radio signals;
a second receiving step of receiving a radio signal including position information from an apparatus through a second wireless communication channel in which position measurement accuracy and radio wave reachable range are higher and shorter respectively than those in the first wireless communication channel;
a second calculation step of calculating the position of the information processing apparatus by using field intensity of each of a plurality of radio signals received in the second receiving step and by using position information included in each of the radio signals; and
a control step of, if a preset condition is satisfied, performing control to switch from calculation of the position of the information processing apparatus based on at least three separate radio signals received in the first receiving step to calculation of the position of the information processing apparatus based on at least three separate radio signals received in the second receiving step,
wherein, in the control step, upon receiving a switching instruction from an apparatus that searches for a position of the information processing apparatus through the second wireless communication channel, determining whether the apparatus that sent the switching instruction is a pre-registered device, and based on a result of the determination, performing switching from calculation of the position of the information processing apparatus based on the at least three separate radio signals received in the first receiving step to calculation of the position of the information processing apparatus based on the at least three separate radio signals received in the second receiving step.

* * * * *